United States Patent [19]
Körmendi

[11] 3,954,369
[45] May 4, 1976

[54] APPARATUS FOR MAKING A LIQUID CONTAINER FROM THERMOPLASTIC SYNTHETIC MATERIAL

[75] Inventor: Kalman Körmendi, Karlsruhe, Baden, Germany

[73] Assignee: Elbatainer Kunststoff- und Verpackungs-GmbH & Co., Ettlingen, Germany

[22] Filed: Aug. 13, 1973

[21] Appl. No.: 387,854

Related U.S. Application Data

[62] Division of Ser. No. 72,389, Sept. 15, 1970, abandoned.

[30] Foreign Application Priority Data
Sept. 16, 1969 Germany.......................... 1946737

[52] U.S. Cl. ................. 425/326 B; 425/DIG. 214; 425/150; 425/325; 264/89; 220/22; 156/588
[51] Int. Cl. .................... B29d 23/03; B29d 23/05
[58] Field of Search ........... 425/110, 111, 114, 116, 425/121, 126 R, 126 S, 325, 326 R, 326 B, DIG. 214; 249/84; 136/166, 176; 156/598

[56] References Cited
UNITED STATES PATENTS

| | | | |
|---|---|---|---|
| 2,541,249 | 2/1951 | Hobson | 425/326 B |
| 3,189,422 | 6/1965 | Shea et al. | 425/DIG. 214 |
| 3,189,422 | 6/1965 | Shea et al. | 425/214 |
| 3,424,623 | 1/1969 | Oakley | 136/166 |

FOREIGN PATENTS OR APPLICATIONS

1,001,737  3/1962  United Kingdom................ 425/214

*Primary Examiner*—Francis S. Husar
*Assistant Examiner*—Robert J. Charvat
*Attorney, Agent, or Firm*—Ernest G. Montague; Karl F. Ross; Herbert Dubno

[57] ABSTRACT

A closed liquid container of thermoplastic synthetic-resin material is formed by blowing and comprises at least one construction element disposed within the container and secured to the wall thereof for dividing the inner space of the container into sections. The apparatus for the production of the container comprises a form tool, and a driving means moving the form tool into an open and closed position, respectively. A tube-forming head of an extruder is disposed on top of the form tool and at least one holding mandrel is movable in axial direction. The mandrel has at least one receiving element for a construction element and is disposed end-sided to the form tool in the head of the extruder.

6 Claims, 11 Drawing Figures

APPARATUS FOR MAKING A LIQUID CONTAINER FROM THERMOPLASTIC SYNTHETIC MATERIAL

This Application is a division of Ser. No. 72,389 filed Sept. 15, 1970, now abandoned.

The present invention relates to an apparatus for producing closed liquid containers of a thermoplastic synthetic-resin material by blowing process.

In such relatively large liquid containers, as fuel tanks, it is required to dispose therein construction elements whereby with the containers are reinforced and in which the hydrodynamic forces of the moving liquid during transportation, are at least partly intercepted and absorbed.

In known liquid vessels, these requirements are fulfilled by the use of sheet metal containers with reinforcement ribs and metal sheets welded in the inner space or riveted therein. The production of such containers requires, complicated processes for the mounting of the sheet metal parts and the subsequent liquid tight closing of the containers, as well as appreciable material costs. Furthermore, the appreciable weight of these known containers can be disturbing or even undesirable.

It is an object of the present invention to provide an apparatus for making a closed container in an economical manner and of sufficient strength.

It is another object of the present invention to provide an apparatus for forming a closed liquid container by the blowing process, with at least one construction element, preferably at least partly of a synthetic resin material secured to the container wall at least at some points and sectionally dividing the container innerspace.

A prefabricated construction element, reinforcing the container wall, is secured in the container of synthetic-resin material as it is produced in a liquid-tight form in the blowing process merely by material deformation so that this construction element serves simultaneously as a fortified or intermediate wall.

The construction element can thus be a reinforcement rib extending crosswise or length-wise over a side wall or also over the entire container periphery, or an intermediate wall disposed permitting the passage of liquid or defining a liquid tight compartment. Advantageously, the container has in its wall at the height of the construction element at least one indentation, on the wall face of which, turning toward the interior of the container, the construction element is seated its outer edge. This indentation can extend bead-like over the entire container periphery and can surround the ring-or disc-shaped closed construction element with a seal which is either liquid-tight or capable of passing liquid. The liquid tightness is required if an intermediate wall serves as a separation wall between a plurality of adjacent compartments in a container, which may have in its outer wall a filling and discharge opening for each compartment. The liquid passage is permissible if the intermediate wall serves as a reinforcement wall for a single-compartment container.

Advantageously, the reinforcement insert is seated with only one or more sections of its periphery on one or more indentations formed in the container wall to define openings for the liquid passage between the reinforcing insert and the container wall. Preferably the reinforcing insert is seated with its edge on at least two indentations, advantageously disposed opposite each other and peripherally spaced apart, thereby stabilizing the entire container and reducing its tendency to vibrate.

During use of a thermoplastic synthetic resin material, for the insert, either as a rib structure or as an intermediate wall, its sections are embedded in the material of the container wall and welded with the latter.

In case of a very voluminous container with a large area intermediate wall or insert, it can be necessary, to stabilize the intermediate wall relative to the container wall. In this case the intermediate wall is braced with respect to the container wall in its longitudinal direction by at least one bracing element consisting of thermoplastic synthetic resin material, for example a tube, rod or thread, of which at least an end section is welded into the wall of the container. For this purpose the intermediate wall can be preformed with the bracing element. If in a container a plurality of intermediate walls are used, the latter are advantageously also connected together by means of the bracing by preforming this assembly or by producing it integrally in one piece.

The liquid container can be produced particularly economically and can make use of a hose-shaped starting body (empty tubular parison) of a plastic, deformable synthetic-resin material which is shaped in a forming tool adapted to be opened and closed transversely to the parison-feed direction by impressing of a pressure medium. The construction element is inserted, as an independent part at the time the forming tool is open, into the parison up to a securing plane. Thereafter, but still prior to and/or during the closing of the forming tool at least one section of its form wall at in the securing plane presses the juxtaposed wall section of the parison against the outer edge of the insert and connects the insert to the parison wall. Only then is the parison, enclosed in the forming tool and still in a deformable state, is brought into its final form by introduction of the pressure medium.

The apparatus according to the invention can employ a segment-shaped forming tool, movable by a driving device into an open or a closed position, and a tube-producing head of an extruder disposed thereabove. At the end of the form tool, preferably in the head of the extruder, is disposed at least one holding mandrel movable in its axial direction with at least one receiving element for the insert to be lodged in the extruded tube or parison.

With this arrangement, an exact introduction of the construction element to the depth of the securing plane is obtained and such positioning of the insert take place simultaneously with the introduction of the parison into the open forming tool. The holding mandrel holds the insert, until the closing movement of the forming tool has pressed the wall section or sections of the parison disposed at the level of the insert against the outer edge of the insert and has connected the insert and parison wall together. Depending upon the shape of the holding mandrel, its enclosed section remains in the container after the blowing process and serves simultaneously as bracing element or is removed from the container, whereupon the remaining opening is closed or is formed as a filling or a dispensing opening.

Advantageously the form tool has, in the plane at which the insert is to be anchored in the container, at least one holding claw extending at least temporarily inwardly out of the form wall. The face of the holding-claw pointing towards a vertical center plane of the form tool is formed with a profile at least partly embracing the outer edge of the insert. Preferably, the form tool has at least two such holding claws, which are disposed about diametrically opposite one another on opposite sides of the insert. Already PRIOR to the closing of the form tool, the holding claws are urged towards one another and grip the outer edge of the insert equally, pressing the wall sections of the parison against the insert and hold the latter tightly, whereupon the holding mandrel is immediately retracted and can be returned into its original position. The forming tool thus remains partly open for the duration of the retraction interval, so that the closing movement of the forming tool takes place in two steps. In the first step, the form halves of the form tool are brought together only up to the diameter of the holding mandrel at the closing edges, while the holding claws projecting from the form wall press the walls of the hose-shaped parison against the edge of the insert and weld both together. Thereafter the holding claws remain engaged, until the holding mandrel is moved out of the forming tool whereupon, in the second moving step, the form tool is completely closed. For this purpose the holding claws are yieldably mounted in the wall of the forming tool, since they are urged back during the second moving step into the form wall. The holding claws can be under the pressure of springs in the direction towards the center of the forming tool.

If the insert serves as a protecting wall, it is of advantage, to form the holding claws such, that they project also from the forming wall, when the form tool is closed, and moved out, respectively. During the blowing process, the wall of the preliminary body is stretched about the holding claws, so that indentations are created in the container wall, on the wall face of which pointing towards the inner space of the container, the insert sits with its outer edge. By using relatively narrow holding claws, stay-like indentations are thus formed, between which and about the insert substantially uniform passage openings extend to pass the liquid to be received by the container.

In accordance with a further embodiment of the apparatus, designed in accordance with the present invention, the holding claws of a controllable driving device are at least movable partly independently of the closing movement of the forming tool in the direction to its vertical center plane. As a driving device can serve, for example, electro-magnets, to which a switch operable by a moved part of the apparatus is coordinated. Or in devices with a form tool to be closed or to be closed pneumatically or hydraulically, each of the holding claws is coordinated to one pressure cylinder inserted in the pressure conduit system with a piston pressing the holding claw under the influence of a pressure medium against the outer edge of the construction element.

The closing movement of the form tool is preferably released by a result operated control, which can originate from the holding mandrel, the holding claws or from another device equipped, by example, with sensing elements.

With these and other objects in view, which will become apparent in the following detailed description, the present invention will be clearly understood in connection with the accompanying drawings, in which.

Figure 1:
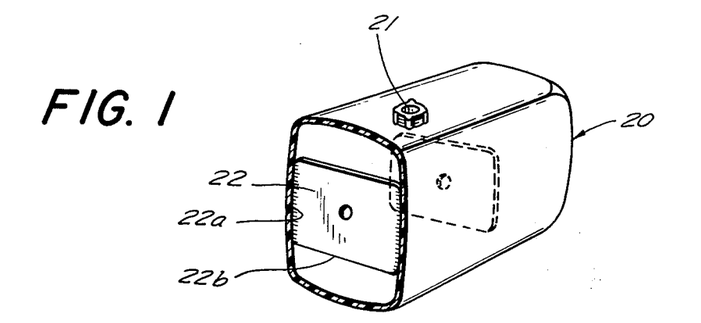
FIG. 1 is a perspective view of a liquid container in cross-section in the shape of a parallelopipedon with a construction element serving as a protective wall in a first embodiment.

Referring now to the drawings, and in particular to FIG. 1, the liquid container, shown of a parallelopipedon shape, is formed in a blowing process of a thermoplastic synthetic material liquid tight and has in a side wall a filling-and a discharge opening 21, which dependent upon its use is equipped with a closure or a suitable armature. In its inner space, the liquid container has two construction elements 22 disposed spaced apart from each other, which are designed as rectangular intermediate walls with a length corresponding with the width of the liquid container and with a height, which is much lower for the formation of passage openings for the liquid to be received by the container than the height of the container. The intermediate walls are welded only with their short edge faces 22a at both oppositely disposed side walls of the container at about medium height. The intermediate spaces, disposed between the longitudinal edges 22b and the container wall, serve as the already mentioned liquid passage openings.

Figure 2:
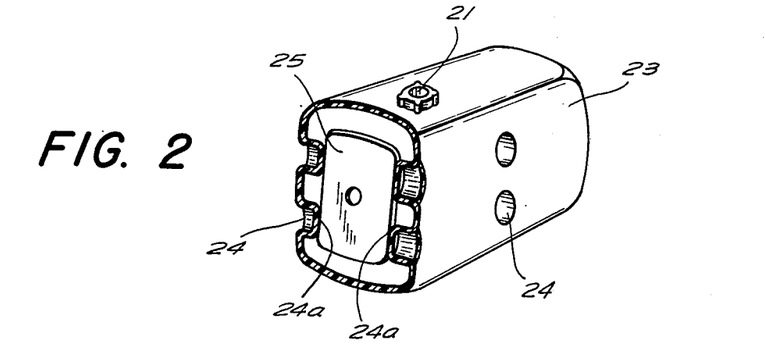
FIG. 2 is a perspective view of a liquid container in cross-section in the form of a parallelopipedon with a construction element serving as a protective wall in a second embodiment.

The liquid container 23, likewise of parallelopipedon shape, shown in FIG. 2, has at two oppositely disposed side walls four indentations 24, which are uniformly pressed inwardly from the container wall and are arranged in pairs opposite each other. The indentations 24 project in the manner of small stays into the inner space of the container and carry on their end wall 24a pointing towards the inner space, two rectangular intermediate walls 25 crosswise disposed spaced apart from each other, the face of the intermediate walls 25 being appreciably smaller as to its height as well as to its width, than the cross-section of the hollow space of the container. The intermediate walls sit embedded with the corresponding section of their vertical edge faces in a hollow profile of the indentation end walls 24a and are in addition welded to the latter. The stay-like indentations 24 secure not only the intermediate walls, rather secure simultaneously a permanent distance between the edge of the intermediate wall and the container wall for the formation of the passage openings already mentioned in connection with FIG. 1 for the liquids to be received by the container. Thus the intermediate walls serve as protective walls as well as for the stabilization of the container wall.

Figure 3:
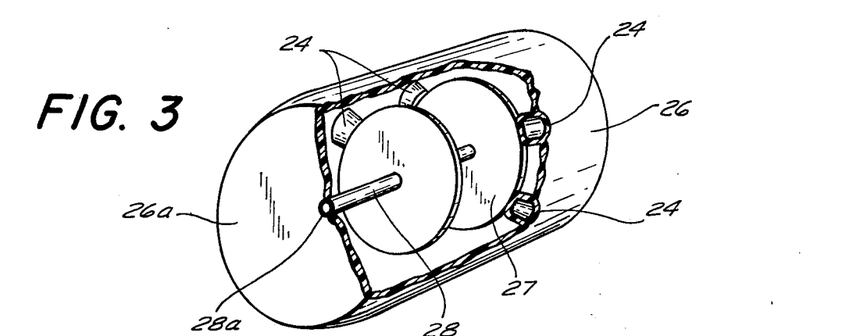
FIG. 3 is a perspective view of a partly broken up liquid container in a round-cylindrical form with a construction element serving as a barrier in a third embodiment.

The disc-like intermediate walls 27 disposed in FIG. 3 in a round-cylindrical liquid container 26 in the previously described manner have to perform the same tasks. As in the embodiment shown in FIGS. 1 and 2, the intermediate walls sit with their edge on the stay-like indentations 24 as in the embodiment disclosed in FIGS. 1 and 2, the intermediate walls sit with their edge on the stay-like indentations formed out of the container walls. Beyond that, the intermediate walls with the container are braced in the longitudinal direction by a tube 28 consisting likewise of a thermo-plastic synthetic material, which tube 28 is rigidly connected with both intermediate walls in the longitudinal axis of the container and is welded with a free end section 28a in one of the end walls 26a of the container. The tube end section 28a projects out of the container walls 26a and is closable from the outside with known means. The tube 28 itself reaches in the inner space of the container with its other non-secured end section up onto the second container end wall and serves during the discharge of the container in its upright position simultaneously as a suction tube. Instead of the tube 28, the intermediate walls 27 can, however, be braced also with a rod or with a comparatively strong thread, preferably likewise of synthetic material, whereby then the filling and discharging opening is disposed at another suitable location.

Figure 4:
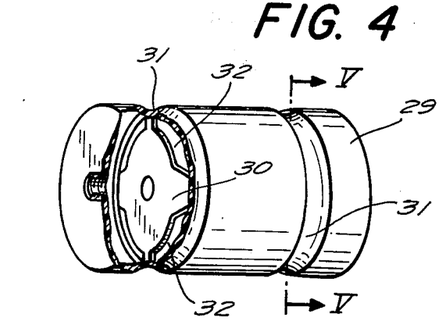
FIG. 4 is a perspective view of a partly broken up liquid container in a round-cylindrical form with a construction element serving as a sound barrier, in a fourth embodiment.
Figure 5:
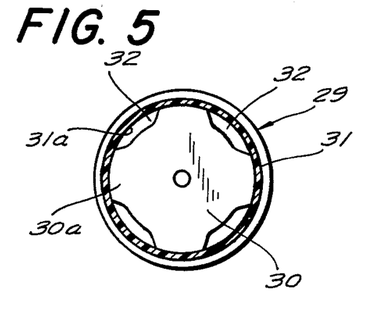
FIG. 5 is a section of the liquid container along the lines V—V of FIG. 4.

FIGS. 4 and 5 show likewise a round-cylindrical liquid container 29 with two intermediate walls disposed crosswise spaced apart from each other, which are secured with a likewise annularly closed indentation 31, passing on the container periphery. The intermediate walls 30 are discs with a diameter, which is slightly smaller than the inner diameter of the container. These discs serve also in this embodiment as protecting walls and have as liquid passage openings at the edge four recesses 32 uniformly distributed over the periphery, so that they sit nearly with the four wall sections 30a remaining between the recesses on the wall face 31a, pointing towards the inner space of the container, of the annular indentation 31 of the container and are connected with the wall of the latter.

In case of a substantially equal design of the liquid container, however, with intermediate walls without the recesses 32, three chambers tightly closed relative to each other would be formed in the container, which chambers were suitable for the separate reception of different liquids in one container. In this case, the container 29 would require for each divided chamber a filling and discharging opening.

Figure 6:
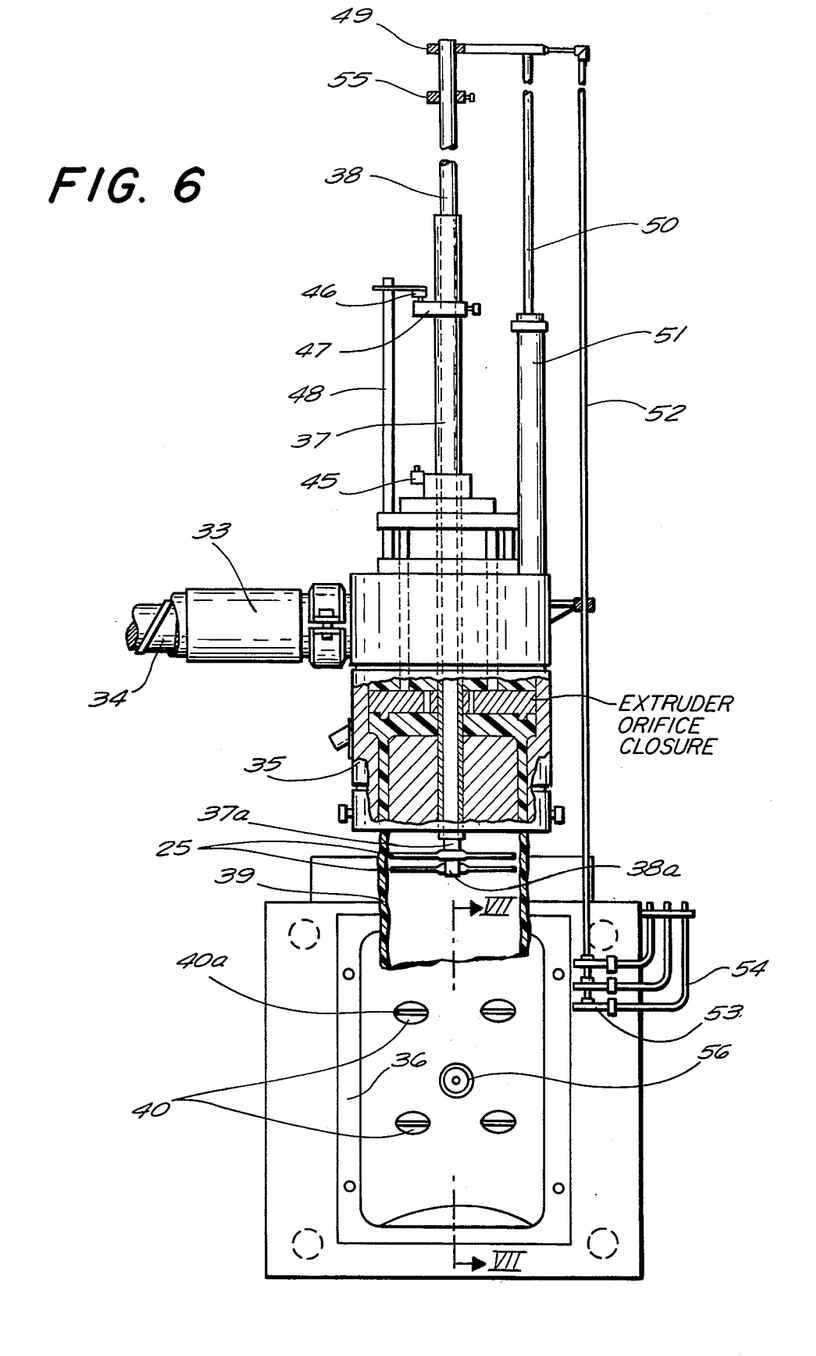
FIG. 6 is a side elevation of a broken part of an extruder with its hose-form head and a form half of an opened form tool with a first embodiment of the apparatus, designed in accordance with the present invention.
Figure 7:
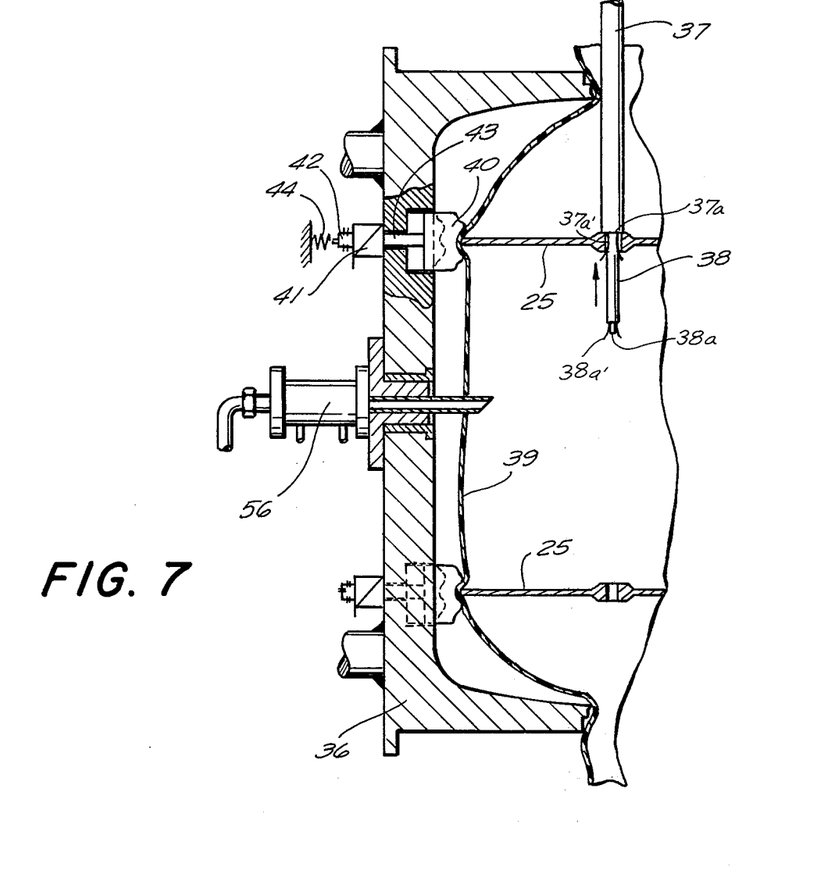
FIG. 7 is a section of the form half shown in FIG. 6, of the partly closed form tool along the lines VII—VII of FIG. 6, at an enlarged scale, and partly broken up to a holding claw, with two intermediate walls inserted into the synthetic material hose.

Referring now again to the drawings, and in particular to FIGS. 6 and 7, an embodiment of an apparatus for the production of the liquid container 23 in accordance with FIG. 2 is shown. From a known extruder only the broken up starting member of the pressure cylinder 33 with the worm 34 is shown, connected with a hose-form head 35, which is disposed above a form tool shown only with one form half 36. This form tool is a known manner divided into two form halves, which are movable crosswise to the feeding direction of the formable synthetic material hose into an open or a closing position. The hose-form head 35 is equipped with a known and for this reason not shown device for the opening and the closing of the annular hose ejecting opening. A two-part holding mandrel disposed in the center relative to the hose ejecting opening and telescopically movable in axial direction out of the hose-form head is mounted in the hose-form head. This holding mandrel comprises a tube 37 extending perpendicularly through the hose-form head 35 and a round rod 38, which both have on their end section, pointing towards the form tool, the known and for this reason not explained receiving element 37a and 38a with spring claws 37a', 38a' for an easy releasable mounting of an intermediate wall 38. The holding mandrel is shown in FIG. 6 in its resting position above the form tool. Two intermediate walls 25 are mounted on the receiving elements 37a and 38a, which intermediate walls 25 are disposed in the lower section of a hose 39 of synthetic material emerging from the hose-form head tightly under the hose-form head. The intermediate walls are, as to their periphery, smaller than the hose, so that they don't engage during exact longitudinal feeding.

In the wall of the form tool 36 are mounted in suitable recesses eight holding claws 40, which are divided over two securing planes and are disposed opposite each other in pairs. The holding claws are movable independently from the closing movement of the form tool crosswise to its perpendicular center plane. To each of the holding claws is coordinated an electromagnet 41 rigidly disposed on the form tool, the movable core 42 of the magnet 41 being connected with the holding claw by means of a bolt 43 guided in the form tool wall. A spring 44 tends to maintain the holding claw in a resting position withdrawn in the forming tool wall, in which the magnet core 42 is outside of the magnet winding.

In the current circuit of the electro-magnets 41 are disposed two end switches 45 and 46, which are disposed spaced spart from each other within the moving range of a switching member 47 adjustable in its position on the outer tubular part 37 of the holding mandrel. The one end switch 45 sits directly on the hose-form head at the upper end of the guide for the holding mandrel, while the second end switch 46 is secured at a suitable distance above the first one in a holder 48. The switch spacing corresponds with the movement path of the upper intermediate wall 25 from the resting position shown in FIG. 6 up into the upper securing plane, in which the upper holding claws 40 are mounted in the form halves. The inner part 38 coaxially guided in the tubular holding mandrel part 37 projects downwardly merely with the receiving element for the lower intermediate wall, however, upwardly with appreciable length out of the tubular-shaped holding mandrel part and is connected with the end section on this side by means of a cross-bar 49 with the piston rod 50 of a control cylinder 51 operatively disposed in a hydraulic system. On the mentioned cross-bar 49 sits furthermore a transmission rod 52, which extends outside of the apparatus parallel to the holding mandrel and carries within the range of the form tool 36 three photocells 53 disposed tightly one below the other, which three photocells 53 are connected by means of the only partly shown electrical cables 54 and a known and for this reason not shown control device for the hydraulic system with its hydraulic pump.

The operation of the apparatus in accordance with FIGS. 6 and 7 is performed as follows: telescopically from An intermediate wall 25 each, produced of a weldable synthetic material, is mounted on the receiving elements 37a and 38a of the two parts 37 of the holding mandrel 37 and 38. A hose section 39 consisting of a formable synthetic material is ejected from the hoseform head 35, which hose section 39 includes at first the intermediate walls 25 in its hollow space and then enters into the opened form tool 36. When the lower edge of the hose is at the level of the sensing photocells 53, the latter emit their control impulse to the hydraulic pump (not shown), by the oil pressure of which the inner part 38 of the holding mandrel is moved downwardly via the control cylinder 51, the piston rod 50 and the cross-bar 49 of the inner part 38 of the holding mandrel, the lower section of which part 38 thus projects downwardly tleescopically from the outer tubular holding mandrel part 37 and inserts the lower intermediate wall into the open form tool. The photocells 53 connected by means of the transmission rod 52 with this part 38 of the holding mandrel join the perpendicular feeding movement and control their speed by the sensing of the lower hose edge, so that its movement relative to each other is performed synchroneously. As soon as the lower intermediate wall 25 moved already with the inner part 38 of the holding mandrel has the distance form the resting upper intermediate wall 25, which distance corresponds with the distance of the two horizontal securing planes for the intermediate walls formed by the holding claws 40 a setting ring 55 adjustably secured on the part 38 of the holding mandrel abuts the upper end face of the outer tubular part 37 of the holding mandrel and joins the latter during the continued vertical movement. At the moment of the entrance of both intermediate walls 25 into their securing planes between the holding claws 40, the switching member 47, secured to the outer part 37 of the holding mandrel, engages the lower end switch 45, which breaks up now the feeding movement of the hose and the holding mandrel and initiates the feeding movement of the form tool. At first the form halves are brought together by the hydraulic system (not shown), such that the holding mandrel between the upper closing edge of the form tool has still play for moving out from the form tool. In this position, shown in FIG. 7, the form halves switch now over the switches (not shown) of the electro-magnets 41 into the current circuit, so that their coils are excited and the magnet cores 42 are pulled. By this arrangement the holding claws 40 push out in the direction to the vertical center plane of the form tool from its wall and press with its groove-like profiled inner faces the hose wall disposed still in its own heat against the edge of the intermediate walls 25, in order to weld both together. In this position the holding claws 40 operate switches (not shown), which in turn switch on again the hydraulic system, the control cylinder 51 of which moves back the parts of the holding mandrel from the receiving bores of the intermediate walls and from the form tool upwardly into the resting position shown in FIG 8. Here operates a switching member 47 of the holding mandrel the second, upper end switch 46, which starts the final closing of the form tool and renders the electro-magnets 41 without current. Thereafter, air is blown in known manner into the hose section by means of a laterally disposed blowing pin 56, whereby its wall is stretched into the final container form.

In the rapidly succeeding working movements of the apparatus parts in a series fabrication, it can occur, that the intermediate wall, inserted from the holding mandrel into the form tool, tips off or even falls off. This causes, that the intermediate wall edge is not gripped by the holding claws moved outwardly from the form wall and also does not sit after the forming of the container on the indentations of the container wall and also not secured thereto. In order to avoid this, a control device with impulse generators is coordinated to the holding claws 40, which impulse generators are connected with the driving device for the form tool and the closing movement of which releases only after performed working movement of the holding claws, and in particular only if their working movement is limited by the abutment against the edge of the intermediate wall. Since the form tool is driven preferably hydraulically, the pressure cylinders 59 of the holding claws are switched on in the embodiment of FIG. 8 for the sake of simplicity into the pressure conduit system of the driving apparatus operating the form tool. Each of the pressure cylinders has during the working movement of the piston 58, limited by the edge of the disc-like intermediate wall 27, a pressure medium discharge opening 61 covered by the piston 58, which opening 61 is freed by the piston only upon surpassing the limit of the working movement in the direction towards the vertical form tool center plane for a pressure medium exit.

Figure 8:
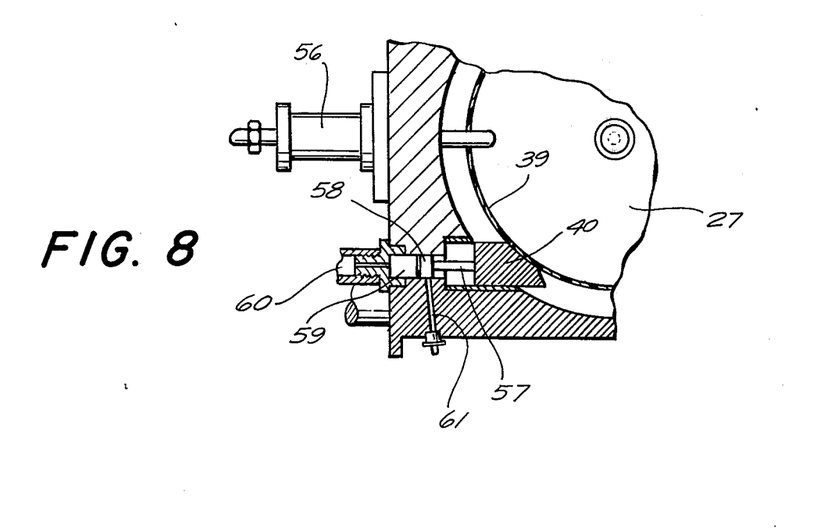
FIG. 8 is a fragmentary section of the form half of the form tool with a second embodiment of the apparatus, designed in accordance with the present invention.

Thus in the embodiment disclosed in FIG. 8, the effect is brought about, that if an intermediate wall 27 is not arranged in the securing plane, at least one of the holding claws pushes into the open during its working movement beyond the otherwise limited position by the intermediate wall and its driving piston frees thereby the pressure medium discharge opening extending from its pressure cylinder, through which now the pressure medium can flow off into a pressure-free container. Accordingly, in the pressure conduit system, the pressure is reduced such, that it does not suffice any more for a switching impulse for closing of the form tool. By this arrangement the working succession of the apparatus is interrupted and can be put into operation again only after the position of the tipped off intermediate wall is corrected. By this arrangement, it is assured that the container preliminary bodies are formed only in case they are in a correct position and accordingly upon correct securing of the intermediate walls about these walls to a dense container.

This safety problem could be solved also differently, by example, by electrical means.

Figure 9:
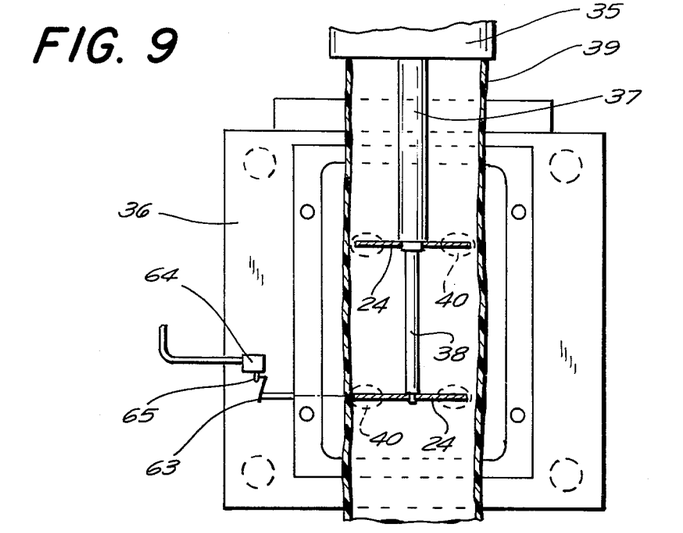
FIG. 9 is a part view of the apparatus according to FIG. 6, partly in section with an embodiment for a control device.

In FIG. 9 another embodiment of a control device to the apparatus according to FIGS. 6 and 7 is shown. In accordance with this embodiment, a switch bow 63 with a comparably short run-up face and an electric key switch 64 connected to the holding claws 40. All switches are disposed in series in the current circuit for the driving device for the closing movement of the form tool. The pressure key 65 of each switch is set such in the swinging range of the switch bow 63 coordinated thereto, that the latter stands only in case of a correct engagement of the holding claw 40 on the intermediate wall edge at level of the pressure key run up on a short bow face and secures the pressure key pressed in its switching position. Prior to, as well as behind this position, the switch is in inoperative position, so that from the entire arrangement it results, that upon pressing of all holding claws on the intermediate wall edge the totally operated key advances the current impulse for the closing movement of the form tool. If, however, at least one holding claw has not come into engagement against the intermediate wall edge and moves beyond this position, the corresponding switch bow is moved beyond the switching position, whereupon the current circuit and, thereby, the closing movement of the form tool is again interrupted.

Figure 10:
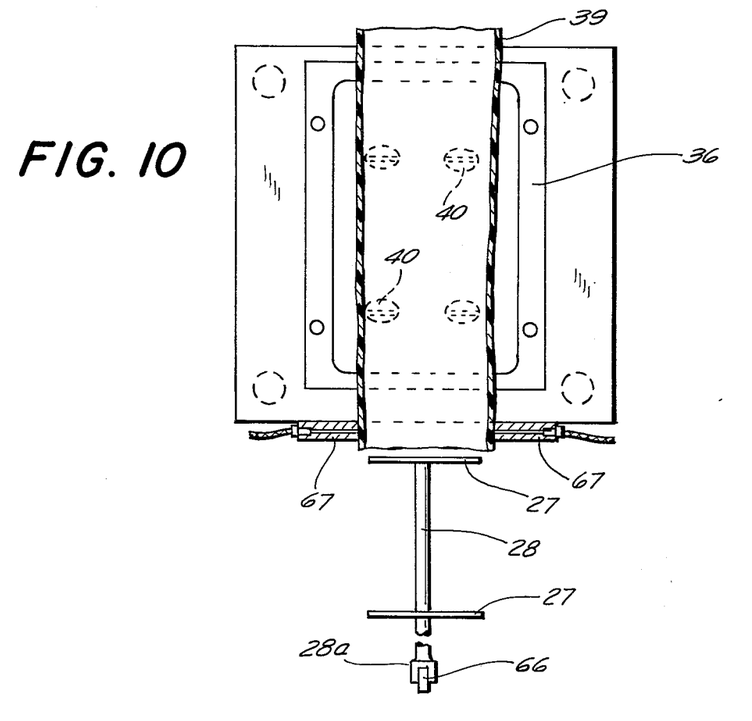
FIG. 10 is a fragmentary view of the apparatus according to FIG. 6, with a third embodiment of the apparatus designed in accordance with the present invention.

Referring now again to the drawings, and in particular to FIG. 10, an apparatus for the production of a liquid container is shown, as it is indicated by example in FIG. 3. In this apparatus, the intermediate walls 27 are pre-mounted in a tube 28 of thermo-plastic, synthetic material at a distance adjusted to the distance of the holding claws 40 and welded together with the latter. The tube sits in centrally disposed bores of the intermediate walls. It extends from the upper intermediate wall on one side downwardly, at a right angle to the intermediate walls through the lower intermediate wall and is mounted on a vertically movable holding mandrel 66 below the form tool 36. On the lower side, thus pointing towards the mentioned holding mandrel, vacuum claws 67 sit on the form tool, which have the task, after insertion of the hose 39 of synthetic material, to secure the lower edge disposed between the vacuum claws by engagement of a vacuum widely open, as long as the holding mandrel 66 slides in the synthetic material tube with the intermediate walls 27 from below into the hose. Upon reaching the position, in which the intermediate walls 27 stay at the level of the holding claws 40, the working processes take place for the securing of the intermediate walls, as well as for the closing of the form tool and for the final formation of the container substantially such, as it has been described in connection with FIGS. 6 to 9. On the other hand, in the present instance, the apparatus can be formed simpler, since the tube 28 of synthetic material is enclosed with the intermediate walls 27 jointly in the container and embedded and welded with its free end section during the closing movement of the form tool between the lower closing edges in the wall of the hose of synthetic material. Depending upon how the intermediate walls are to be secured to the container wall, either the holding claws 40 projecting from the form wall can be disposed rigidly, or they can be disposed of entirely, because the intermediate walls are secured by the tube 28 and the form halves of the form tool 36 are suitably completely closed in one step.

Figure 11:
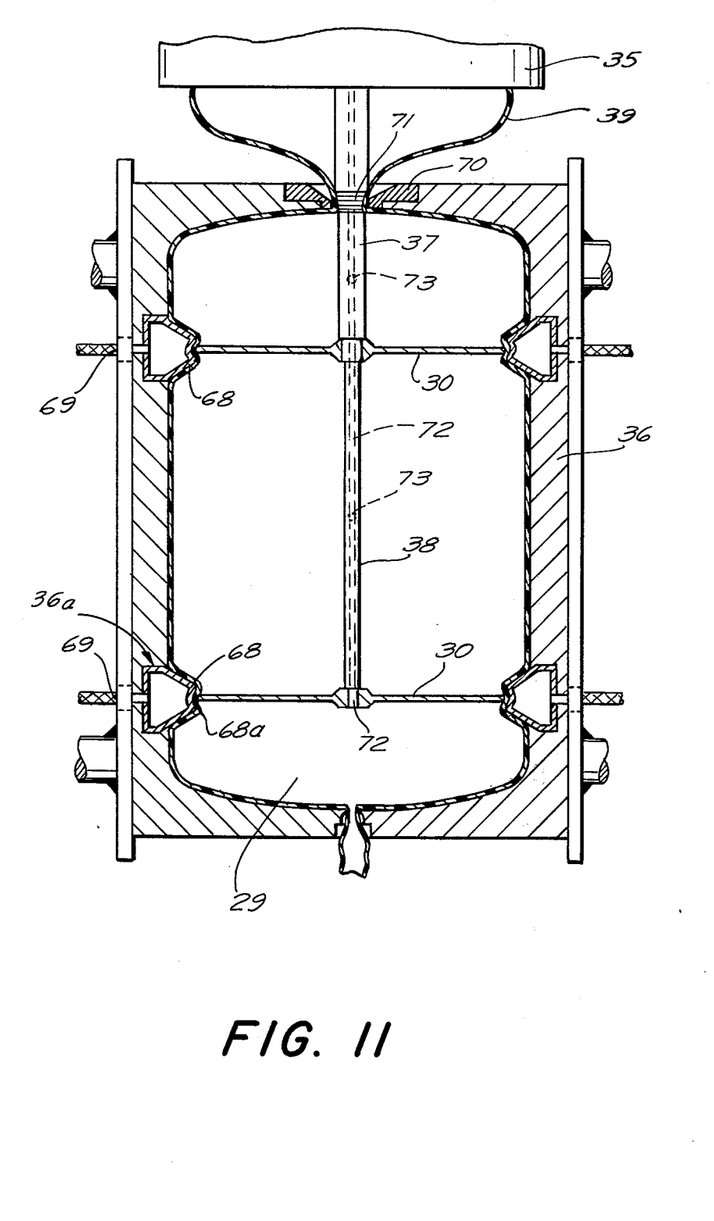
FIG. 11 is a cross-section through a form tool with a fourth embodiment of the apparatus designed in accordance with the present invention.

Referring now again to the drawings, and in particular to FIG. 11, an apparatus for the production of the liquid container 29 in accordance with FIGS. 4 and 5 is shown. The form halves of the form tool have half-cylindrical hollow chambers adjusted relative to each other with two half-circular shaped grooves 36a, in which grooves 36a a hose-shaped holding claw 68 consisting of an elastic material is disposed, on which two claws form in case of a closed form tool a closed annular form. They have on the inside a profile 68a adjusted to the intermediate wall edge and on the outside a connection 69 to a pneumatic system, which, as already mentioned before, is known per se and for this reason is not shown in detail. In the center of the upper closing edges calibration claws 70 are inserted which are adjusted to a section of the holding mandrel equipped with an outer thread 71. The intermediate walls 30 are, as already described, in connection with FIGS. 4 and 5, discs with a diameter, which corresponds with the inner diameter of the annularly closed holding claws 68 subjected to pressure, and have at the edge wall sections 30a on the periphery uniformly divided and recesses 32. They are inserted, the same as in the devices shown in FIGS. 6, 7 and 9, with a holding mandrel 37 and 38 rollable telescopically into the form tool from the hose-form head 35. The switch member 47, shown in FIG. 6, of the holding mandrel switches thereby, however, upon reaching the switch 45 immediately the closing of the form tool in one step. The hose-shaped holding claws stand thereby under a slight vacuum pressure with a profile 68a pulled into the grooves 36a. During the blowing process, the air pressure reaches likewise the holding claws, which thereupon blow up and surround rigidly with their profile 68a the intermediate walls 30, in order to embed their wall sections 30a into the wall of the preliminary body and to weld both together. The blowing air for stretching of the preliminary body originates in this embodiment with the hose-nary body by a bore 72 passing longitudinally through the holding mandrel and lateral discharge openings 73 into the inner space of the preliminary body which obtains thereby the form or shape shown in FIG. 4. Only thereafter, the holding mandrel 37 and 38 remaining in the form tool is run out, which holding mandrel is moved rotatably, however, at the start of the upward movement additionally about its longitudinal axis, in order to leave a container opening equipped with an inner thread with the threaded section 71, which container opening can be closed with a screw closure.

The production of the already initially mentioned liquid container, in which for a division of the container space into several receiving chambers, the intermediate walls are to be built-in as separation walls liquid tight, required merely an adjustment of the above described devices. Thus can, by example, in the device according to FIG. 11, full disc-shaped intermediate walls be inserted by means of a rod of a synthetic material into the form tool, which rod, during and after the formation of this container, remains enclosed in the latter and, under circumstances, is connected with the container wall as a bracing element. It is to be understood, that for the formation of such container in each space part the pressure means have to be blown in, whereby suitably each penetration point of the blowing mandrel after the formation is made useful as a filling-and discharge-opening.

The liquid containers produced in accordance with the described process, as well as the devices for performing the method, can be adjusted by variation or addition of known technical means to the prevailing requirements. Thus, for example, for the production of most of the containers the control device equipped with light gates is not required at all, while partly perhaps instead of a light gate better other sensing elements electronic or with ultra-sound are inserted. Such variations and simple further developments of the previously described devices are within the framework of the present invention.

While I have disclosed several embodiments of the present invention, it is to be understood that these embodiments are given by example only and not in a limiting sense.

I claim:

1. An apparatus for the production of a closed liquid container of thermoplastic material, comprising:
   a forming tool comprising at least two separable mold parts defining a blow molding cavity conforming to the ultimate shape of said container in a closed condition of said tool;
   an extruder head disposed above said forming tool for extruding a tubular parison of said material into said cavity in an open position of said mold parts;
   at least one holding mandrel mounted adjacent said forming tool and displaceable axially into said cavity and provided with means for mounting an insert in said container reaching toward the lateral walls thereof and at at least two spaced apart locations;
   means connected to said mandrel for axially displacing said mandrel relative to said forming tool and for shifting said mold part toward and away from said insert;
   at least one holding claw mounted on at least one of said mold parts and projecting into said cavity for engagement with a juxtaposed portion of the parison wall and urging same against said insert, said claw being provided with a profile for shaping said parison wall to embrace at least partly an outer edge of said insert; and
   means in said mold parts for mounting said claw to enable same to recede into a wall of said forming tool upon closing of said part around said parison.

2. The apparatus defined in claim 1 wherein said mandrel comprises at least two telescoping members, each of said members being provided with means for receiving a respective insert.

3. The apparatus defined in claim 1 wherein said forming tool has at least two such holding claws disposed diametrically opposite one another and engageable with opposite sides of said insert.

4. The apparatus defined in claim 1 wherein the last mentioned means includes a driving device operable independently of closure of said forming tool.

5. The apparatus defined in claim 1 wherein said holding claw comprises a closed hollow body formed on a side turned toward said cavity with an elastic wall carrying said profile, and a blowing device communcating with said hollow body.

6. The apparatus defined in claim 1 wherein the last mentioned means comprises a spring biasing said holding claw into said cavity.

* * * * *